US011225415B2

(12) United States Patent
Markou et al.

(10) Patent No.: US 11,225,415 B2
(45) Date of Patent: Jan. 18, 2022

(54) ADVANCED OXIDATION PROCESS FOR THE EXFOLIATION OF TWO DIMENSIONAL MATERTALS

(71) Applicant: UCHICAGO ARGONNE, LLC, Chicago, IL (US)

(72) Inventors: Demetrios Markou, Lemont, IL (US); Anirudha V. Sumant, Plainfield, IL (US)

(73) Assignee: UChicago Argonne, LLC, Chicago, IL (US)

( * ) Notice: Subject to any disclaimer, the term of this patent is extended or adjusted under 35 U.S.C. 154(b) by 467 days.

(21) Appl. No.: 16/054,868

(22) Filed: Aug. 3, 2018

(65) Prior Publication Data

US 2019/0039905 A1 Feb. 7, 2019

Related U.S. Application Data

(60) Provisional application No. 62/541,498, filed on Aug. 4, 2017.

(51) Int. Cl.
*C01B 32/192* (2017.01)
*B01J 8/08* (2006.01)
(Continued)

(52) U.S. Cl.
CPC ............. *C01B 32/192* (2017.08); *B01J 8/085* (2013.01); *B01J 8/087* (2013.01); *B01J 8/10* (2013.01); *B01J 8/16* (2013.01); *B01J 19/008* (2013.01); *B01J 19/02* (2013.01); *B01J 19/10* (2013.01); *B01J 19/123* (2013.01); *B01J 19/18* (2013.01); *C01B 32/19* (2017.08); *C01G 39/06* (2013.01); *B01J 2208/00176* (2013.01);
(Continued)

(58) Field of Classification Search
CPC ... C01B 32/192; C01B 32/19; C01B 2204/04; C01B 2204/02; C01B 32/182; C01B 32/198; C01B 2204/00; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; B01J 19/18; B01J 19/10; B01J 8/085; B01J 8/087; B01J 8/16; B01J 8/10; B01J 19/008; B01J 19/02; B01J 19/123; B01J 2219/00094; B01J 2208/00212; B01J 2219/0286; B01J 2219/0254; B01J 2219/00189; B01J 2219/0871; B01J 2219/089; B01J 2208/00176; B01J 2208/00867; B01J 2219/0209; B01J 2219/1203; C01G 39/06; C01P 2004/20; C01P 2002/84; C01P 2002/82; B82Y 30/00; B82Y 40/00
See application file for complete search history.

(56) References Cited

PUBLICATIONS

Lin, et al., Simple Technique of Exfoliation and Dispersion of Multilayer Graphene from Natural Graphite by Ozone-Assisted Sonication, Nanomaterials 2017; 7, 125: 1-10 (May 27, 2017) (Year: 2017).*

(Continued)

*Primary Examiner* — Daniel C. McCracken
(74) *Attorney, Agent, or Firm* — Foley & Lardner LLP

(57) ABSTRACT

A system for extracting two dimensional materials from a bulk material by functionalization of the bulk material in a reactor.

19 Claims, 5 Drawing Sheets

(51) Int. Cl.
| | |
|---|---|
| *B01J 8/16* | (2006.01) |
| *B01J 8/10* | (2006.01) |
| *B01J 19/00* | (2006.01) |
| *B01J 19/02* | (2006.01) |
| *B01J 19/12* | (2006.01) |
| *C01G 39/06* | (2006.01) |
| *C01B 32/19* | (2017.01) |
| *B01J 19/18* | (2006.01) |
| *B01J 19/10* | (2006.01) |
| *B82Y 30/00* | (2011.01) |
| *B82Y 40/00* | (2011.01) |

(52) U.S. Cl.
CPC ............... *B01J 2208/00212* (2013.01); *B01J 2208/00867* (2013.01); *B01J 2219/00094* (2013.01); *B01J 2219/00189* (2013.01); *B01J 2219/0209* (2013.01); *B01J 2219/0254* (2013.01); *B01J 2219/0286* (2013.01); *B01J 2219/089* (2013.01); *B01J 2219/0871* (2013.01); *B01J 2219/1203* (2013.01); *B82Y 30/00* (2013.01); *B82Y 40/00* (2013.01); *C01B 2204/02* (2013.01); *C01B 2204/04* (2013.01); *C01P 2002/82* (2013.01); *C01P 2002/84* (2013.01); *C01P 2004/20* (2013.01)

(56) References Cited

PUBLICATIONS

Rider, et al., Ultrasonicated-ozone modification of exfoliated graphite for stable aqueous graphitic nanoplatelet dispersions, Nanotechnology 2014; 25: 195607, pp. 1-12 (Year: 2014).*
Kim, et al., Directexfoliation and dispersion of two-dimensional materials in pure water via temperature control, Nature Communications 2015; 6: 8294, pp. 1-9 (Year: 2015).*
Yi, et al., Kitchen blender for producing high-quality few-layer graphene, Carbon 2014; 78: 622-626 (Year: 2014).*
Fabian, "Reactive intermediates in aqueous ozone decomposition: A mechanistic approach," Pure and Applied Chemistry 78(8), pp. 1559-1570 (2006).
Lai, et al., "Ultraviolet-visible spectroscopy of graphene oxides," AIP Advances 2, 032146, 6 pages (2012).
Pham, et al., "Fast and simple fabrication of a large transparent chemically-converted graphene film by spray-coating," Carbon 48(7), pp. 1945-1951 (2010).
Rao, et al., "Role of Peroxide Ions in Formation of Graphene Nanosheets by Electrochemical Exfoliation of Graphite," Scientific Reports 4, 4237, 6 pages (2014).
Sanchez-Polo, et al., "Combination of Ozone with Activated Carbon as an Alternative to Conventional Advanced Oxidation Processes," Ozone: Science and Engineering 28(4), pp. 237-245 (2007).

* cited by examiner

ADVANCED OXIDATION PROCESS FOR THE EXFOLIATION OF TWO DIMENSIONAL MATERTALS

CROSS-REFERENCE TO RELATED APPLICATIONS

The present application claims priority to U.S. Provisional Application No. 62/541,498, filed Aug. 4, 2017 and incorporated herein by reference.

STATEMENT OF GOVERNMENTAL INTEREST

The United States Government claims certain rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

TECHNICAL FIELD

The present disclosure relates generally to methods for exfoliating "2D" materials.

BACKGROUND

A number of two-dimensional ("2D") materials have been discovered, the most recent of which is graphene. While much research has focused on the novel uses for such materials, it is also critical that the manufacture of such materials be made feasible. Cost-effective means for production need to also be scalable given the wide-scale need for 2D materials. The predominate method of manufacturing 2D materials is exfoliation. The discovery of graphene was made by Andre Geim and his colleague Kostya Novoselov using scotch tape to isolate a single sheet from a bulk block of graphite. Such mechanical exfoliation is not scalable, thus the focus has extended to chemical mechanisms for exfoliating.

The existing methods for the exfoliation of bulk materials to achieve graphene and other 2D like materials involve large quantities of reactive acids and chemicals. Chemical exfoliation now is typically accomplished by the Hummers Method. This method is where a bulk material is soaked in an acid bath to oxidize. This oxidation process adds functional polar groups to the surface and edge of the sheet which allows for easy dispersion in polar solvents. When graphite is oxidized it is called graphite oxide or graphene oxide when in 2D sheets; the later term is referred to single or a few layer sheets of graphene with functional polar groups attached to the edge and surface of the 2D material. However, graphite oxidized by the Hummers method tends to leave defects in the 2D structure, such as crumpled sheets. Such defects are apparent in the Raman characterization data's signature for graphene oxide produced by the Hummers method vs. the characterization data for pristine defect free single to few layer graphene. The existing technique for chemical exfoliation also typically contaminates the 2D materials with unwanted functional groups due to the acidic environment. This, in turn, requires purification to remove these undesired functional groups, adding additional step and cost. Also, these existing methods create waste and require a harsh, difficult-to-work-with environment, which makes the entire process cost prohibitive for mass production.

SUMMARY

Embodiments described herein relate generally to a method of exfoliating two-dimensional materials comprising: adding a bulk material to a water solution in a reactor vessel; dissolving ozone in the water solution; and exfoliating two-dimensional material from the bulk material by advanced oxidation process.

In some embodiments, An apparatus for exfoliating two-dimensional materials from bulk materials comprising a reactor vessel; an external chiller; an ozone source in communication with the reactor vessel; and an agitation system in communication with the reactor vessel.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
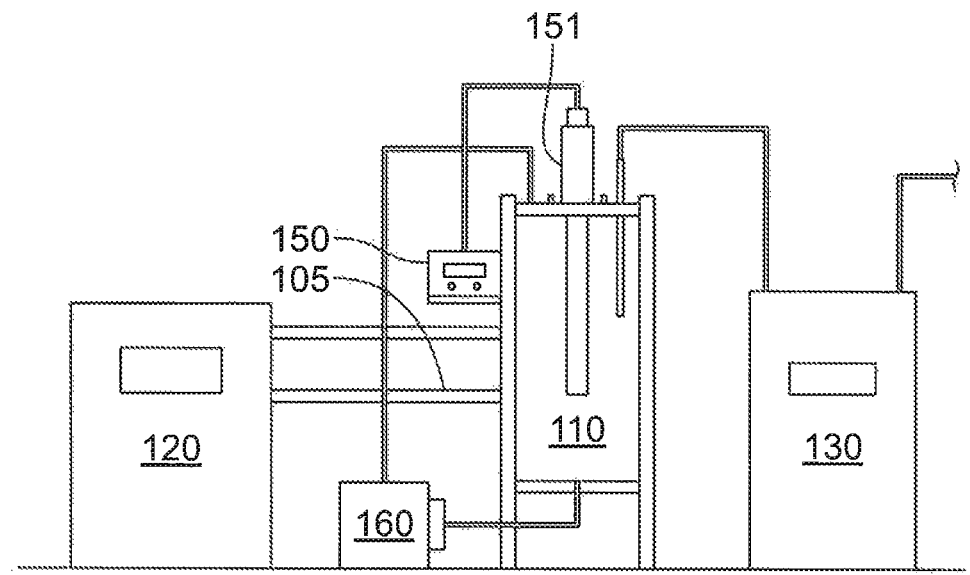
FIG. 1 is a block diagram of the total system.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate to the exfoliation of 2D materials from bulk materials, includes general processes, compositions, and an apparatus for exfoliating from a bulk material with a layered planar structure, more than, or above 10 layers to achieve single to few layer or in a multi layer composition. Described further herein is a process, and accompanying apparatus, for exfoliation based on water that utilizes creation of radicals via the decomposition of ozone in the solution, producing a uniform suspension of 2D materials in a water based solution. The formation of high quality defect free single to few layer material is confirmed by Raman spectroscopy and UV-VIS spectroscopy. Experimental details included herein demonstrate embodiments to exfoliate bulk materials including graphite and Molybdenum disulfide ($MoS_2$). This described process eliminates hazardous chemicals and also reduces cost of production significantly, allowing for a scalable bulk production of high quality 2D materials below ten layers in thickness.

In methods described herein, 2D materials are exfoliated from bulk materials that is generally available from about a nanometer to 100s of micrometers in diameter above 10 layers in stacking. As used herein, 2D materials means a material having 1-10 atomic layers, wherein 1 atomic layer is a single layer and 1-3 atomic layers is "few layers." "Multi layer" means 4-10 layers. As used herein "bulk" means more than 10 layers that is generally available from nanometer to 100s micrometers in diameter; with "bulk material" meaning a corresponding material with a layered planar stacked structure above 10 atomic layers in thickness. The bulk material may be, but not limited to graphite, Molybdenum disulfide (MoS2), Molybdenum diselenide (MoSe2), hexagonal boron nitride (h-BN), Tungsten disulfide(WS2), Tungsten diselenide ($WSe_2$).

A method for exfoliating 2D materials from bulk materials herein are methods for the exfoliation of 2D materials using an Advanced Oxidation Process ("AOP"). AOP is created due to the rapid decay of an $O_3$ molecule in the presence of initiators or promoters within an $H_2O$ solvent. The AOP process takes place in three steps: 1) initiation, 2) propagation of the chain reaction, and 3) termination when there are no more promoters left to react with. The AOP process includes a radical source, so such as $O_3$ or hydrogen peroxide/UV, water, and an initiator or promoter. Embodiments described below make reference to the AOP with ozone, but alternative AOP mechanisms, such as using hydrogen peroxide, may be utilized to similarly provide a repeatable cycle of hydroxyl radicals. Initiators or promoters of the free-radical reactions are those compounds that are capable of inducing the formation of superoxide ion ($—O_2$) from an ozone molecule. Initiators or promoter, referred to herein generally as promoters include, but are not limited to, inorganic compounds such as hydroxyl ions (OH—), hydroperoxide ions ($HO_2$—), solvents like $H_2O_2$, organic compounds such as glyoxylic acid, formic acid, metal, metal oxides, and humic substance that capable of regenerating the ($—O_2$) superoxide ion. It has been shown during remediation studies that activated carbon can enhance ozone transformation into OH radicals, which promotes ozone's rapid decomposition (Zaror, 1997; Jans and Hoigne', 1998; Beltra'n et al., 2002; Ma et al., 2004; Rivera-Utrilla and Sa' nchez-Polo, 2002;). However, ozone naturally decomposes in an $H_2O$ solvent between pH 6-8.5; the rate for its decomposition is dependent on pH. As pH rises, the rate of decomposition increases in solution. The accelerated decomposition of ozone occurs at higher pH levels because the $H_2O$ solvent has a much higher concentration of hydroxyl ions or promoters in solution, at pH 10, the half-life of ozone in water is less than 1 minute. (Munter, R. (2001). *Advanced oxidation processes-current status and prospects. Proc. Estonian Acad. Sci. Chem.*, (50), 59-80.)

$O_3$ is provided by an ozone source 130, in one embodiment a proton exchange membrane (PEM) cell stack, as $O_3$/oxygen, in a ratio of 18 to 20% ozone to oxygen concentration. The allowable amount of ozone dissolved in the $H_2O$ solvent dependents on temperature and the output efficiency of ozone delivered to the system. At 20% delivery efficiency, with a $H_2O$ solvent temp of 15° C., ozone dissolved in solution can be around 93 mg/l, at 35 degrees C. this can be around 36 mg/l. The amount of ozone needed is, in one embodiment, no more than what is needed to keep up with the reaction, which is estimated to be around 0.25 grams per liter per hour at 5° C. for a 100 liter reactor system. It should appreciated that conventional ozone sources may be used in place of a PEM cell stack source. However, PEM cells create pure ozone in the highest concentration, and is free from contaminates from the air, unlike static electric discharge systems. Also the efficiency of an eclectic static discharge system is only 6 percent.

As mentioned, the AOP reaction takes place according to 3 steps: initiation, propagation of the chain reaction, and termination. The AOP reaction is restarted in the presence of promoters in water. As long as there is promoter present, the reaction will not terminate.

The initial reaction involves the generation of a superoxide ion from ozone and a hydroxide ion (from the water solvent or the additional of a promoter), resulting in water and the superoxide ion as follows in a typical general advanced oxidation reaction.

Reaction 1:

$$O_3 + OH^- \rightarrow O2.^- + HO_2.\qquad\qquad 1.$$

The process replenishes the hydroxide by action of the generated water disassociating into hydroxide and hydrogen ions.

Reaction 2, where $HO_2$. dissociates into $H^+$:

$$HO_2. \rightarrow O2.^- + H^+\qquad\qquad 2.$$

This reaction leads to an initiation of a radical chain-reaction (i.e., the propagation step), during which HO radicals are formed. The mechanism of reaction is as follows:

$$O3 + O2.^- \rightarrow O_3 + O_2\qquad\qquad 3.$$

$$O3.^- + H^+ \rightarrow HO_3\qquad\qquad 4.$$

$$HO_3 \rightarrow O3.^- + H^+\qquad\qquad 5.$$

$$HO_3 \rightarrow HO. + O_2\qquad\qquad 6.$$

The HO radicals formed react with ozone, according to the following reaction mechanism:

$$HO. + O_3 \rightarrow HO_4.\qquad\qquad 7.$$

$$HO_4. \rightarrow O_2 + HO_2.\qquad\qquad 8.$$

Step 8 is the termination of the reaction, however it starts and propagates the reaction process all over again if pH conditions allow or in the presence of promoters. (*Pure Appl. Chem.*, Vol. 78, No. 8, pp. 1559-1570, 2006. doi: 10.1351/pac200678081559.)

In one embodiment, illustrated in FIG. 1, a system 101 is provided for carrying out an embodiment of the 2D manufacture described herein. The system 101 comprises a reactor 110, such as double-jacketed or otherwise insulated, a chiller 120, which maybe external to the bioreactor, and an ozone source 130. The components may include tubing 105 or the like to provide a closed communication between the various components, such as for traversing the solvent from the reactor 110 to the ozone source 130 through the chiller 120. The system may be equipped with a stirring mechanism within the reactor system, in combination with an agitator, shown in FIG. 2. In one embodiment, an agitator 140 is provided. The agitation system functions to reduce the processing times with the chiller and further helps the bulk sheets come apart easier shear the sheets apart. Ozone puts functional groups on the surface area of the bulk material. The water solvent then provides polar forces that, due to the functional groups, result in the polar forces exerted to pull it apart in solution. The force exerted by the polar forces is then further enhanced by the agitation, which accelerates the breaking down of the bulk material into 2D materials. For example, experiment 3 below shows no 2D material at we help that process along with agitation which cut the times down, we show this in experiment 3, we got not result at 24 hours with 26 C, we added agitation and the sheets came apart, then we lowered the temp, with agitation reduced processing time significantly.

The agitator 140 may comprise an inline emulsifier 170 external to the bioreactor. Alternatively, the agitator 140 may comprise an external hydrodynamic cavitation system 160 configured to apply shear forces. In yet another alternative, the agitator 140 comprises an ultrasonic system 150 configured to apply ultrasound directly within the bio reactor vessel system. An ultrasonic wand 151 and shown in FIG. 2 may be used as part of the ultrasonic system. In certain embodiments, one or more combinations of the described agitator 140 systems may be utilized.

Also, not shown, an waste processor may be utilized for purposes of destroying or filtering waste ozone exiting the reactor. For example, the waste processor may include filter material where waste ozone can pass through, such as activated carbon, heat, a catalyst material of rare earth metals, or all three in combination.

The reactor 110 includes a reaction chamber for holding the materials during reaction. The reactor can be made from various materials, such as stainless steel or glass. In the illustrated embodiment, the bio reactor 110 is a double jacketed reactor to enable improved efficiency in maintaining the temperature within the reactor. The vessel can be any size or material, as would be understood by those skilled in the art. Generally speaking, scalability is linear and is dependent on the amount of ozone being produced. The bio reactor 110 includes a volume of water that is scalable.

Ozone is bubbled or injected through the solution. The solution with ozone is engaged by the agitator system 140 which provides shear forces for assistance in exfoliation of the bulk material 140. Thus, exfoliation relies upon two main components: 1) the addition of ozone to the solvent at relatively low temperature and 2) agitation by the agitator system 130. Temperature of the solution determines the concentration of ozone within the solvent. The solubility of the graphite and ($MoS_2$) in an $H_2O$ solvent is time and temperature dependent; the lower solution temperatures has significantly shorten processing times, which reduced the method to practice without the addition of preprocessing the bulk material by mechanical or chemical means. This end result creates a water soluble dispersion after extraction.

Figure 3:
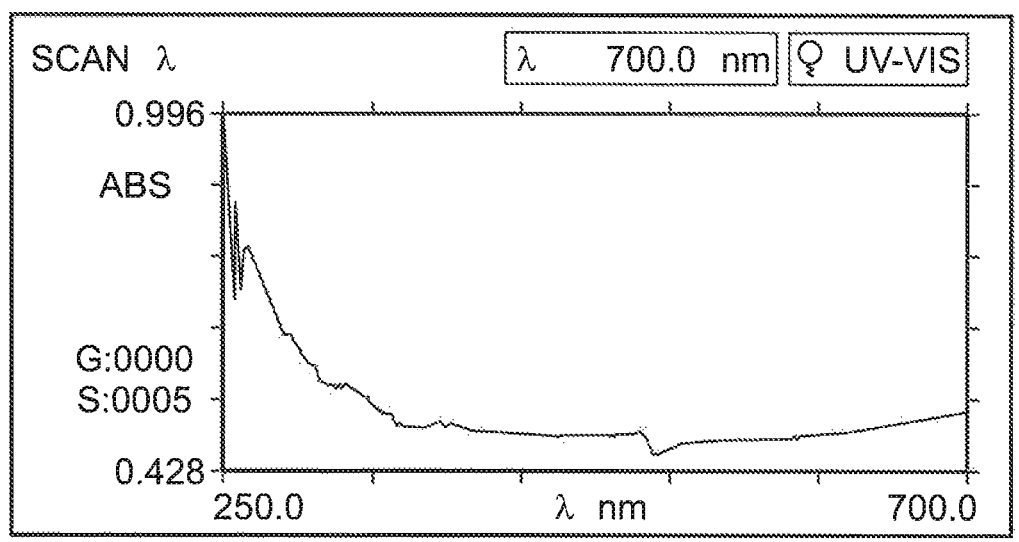
FIG. 3 shows UV-VIS spectra for Experiment 2 with a graphene solution in water at 26° C., single peak at 260 nm, indicating single to few layer suspended in distilled water.

In one embodiment shown in FIG. 3, ozone can be bubbled through the solution, while the solution is circulated through a shearing process in a closed system, while using a mechanical stirrer within the reactor in combination with the agitator system 140 which provides the shear forces in combination with external chiller 120. In one embodiment, ozone is continuously provided to maintain a constant concentration. Further, the system may be a closed loop system other than entry of the ozone. Further, the closed loop may utilize an portion of the agitator system "in line" with the feed tubing rather than in the bio reactor vessel.

In one embodiment, additives may be utilized to enhance exfoliation or alter the resultant 2D material. For example, hydrogen peroxide can be added as liquids. Further, solid particles, such as iron particles, can be added to enhance singlet oxygen production in solution, through a Fenton reaction with ozone.

Further, the solvent may be a multi-solvent system. The solvent may not include water, but hydrogen peroxide, or a mixture of hydrogen peroxide in the $H_2O$ solvent, or can be an inert PFC, or a PFC can be added to the $H_2O$ solvent to create an emulsion.

For the exfoliation process, it is anticipated that all liquid mediums that enhance the exfoliation process with ozone are viable and are within scope of this invention.

EXPERIMENTAL EXAMPLES

Figure 2:
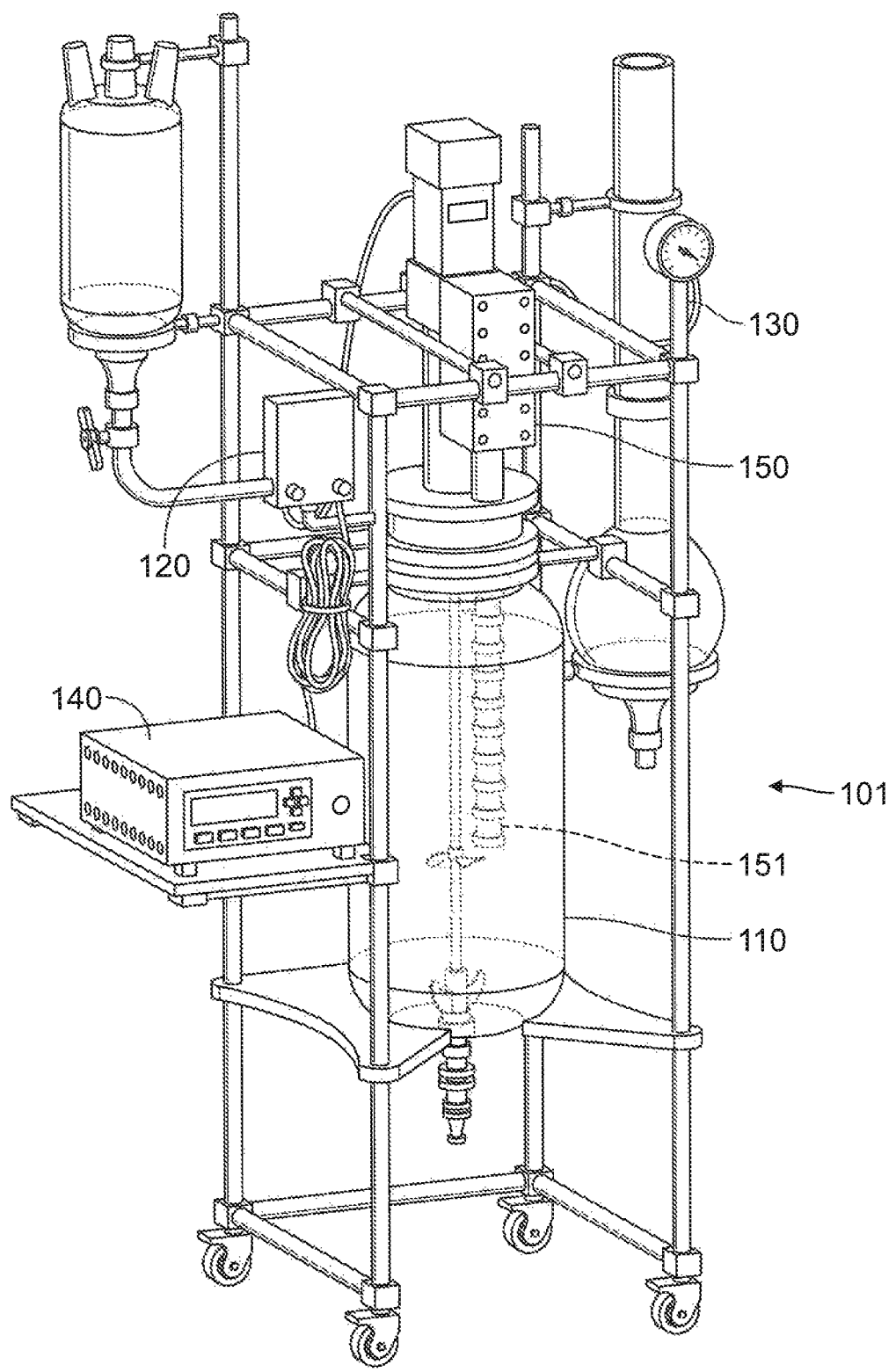
FIG. 2 shows bio reactor developed for exfoliating graphene and other 2D materials in water solution. This includes an embodiment with agitator as an ultrasound wand in communication with reactor, via custom PTFE lid to incorporate the ultrasound wand system.

FIG. 2 shows a bio reactor with a custom PTFE lid designed to communicate the ultrasound wand system with the reactor. The reactor system 110 set up for illustration purposes will includes an external chiller and an ozone source, both in communication with a one hundred liter double walled bio-reactor as shown in FIG. 2. The ozone is injected/bubbled via glass tube into bio reactor during exfoliation, and an ultrasonic wand 151 is incorporated into the bio reactor system 110.

Experiment 1: The experimental method comprised of adding lab grade graphite powder, five (5) microns in diameter inside a two liter double jacketed bio reactor, (2 g) per liter with a neutral pH, distilled water. Ozone production was created using a proton exchange membrane ("PEM"), at least 18-20% ozone to oxygen ratio, for the experiment. 3 hour exposure 26° C., null result, no grapheme detected. The solution was stirred at the same time, at a rate of 650 RPM. Ozone was bubbled within the solution at a rate of 1.6 grams per liter per hour, without the addition of shear forces or chiller.

Experiment 2: The experimental method comprised of adding lab grade graphite powder, five (5) microns in diameter inside a two liter double jacketed bio reactor, (2 g) per liter with a neutral pH, distilled water. Ozone production was created using a proton exchange membrane ("PEM"), at least 18-20% ozone to oxygen ratio, for the experiment. No shear forces added or chiller, 24 hour exposure, (2 g) per liter, temperature measured was 26° C.: UVIS experiment 2 data shows defects, more than 10 layers with heavy precipitation. We let the particles settle then tested the solution; we did detect graphene with Raman in very low concentration. The solution was stirred at the same time, at a rate of 650

RPM. Ozone was bubbled within the solution at a rate of 1.6 grams per liter per hour. FIG. 3 shows UV-VIS graph for the results of Experiment 2.

Experiment 3: The experimental method comprised of adding lab grade graphite powder, five (5) microns in diameter inside a two liter double jacketed bio reactor, (2 g) per liter. The solvent used was distilled water with a neutral pH. The method further comprised of injecting or bubbling ozone within the solution. Ozone production was created using a proton exchange membrane ("PEM"), at least 18-20% ozone to oxygen ratio, for the experiment. Ozone was bubbled within the solution at a rate of 1.6 grams per liter per hour. Shear forces were applied via inline shear emulsifier. Solution temperature measured was 33° C. Total time exposed 17 hours while the solution was stirred at the same time, at a rate of 650 RPM. The dispersion was good, but would precipitate out in a day indicating less functionally at the higher temps and lower concentration of ozone dissolved in solution.

Figure 4A:
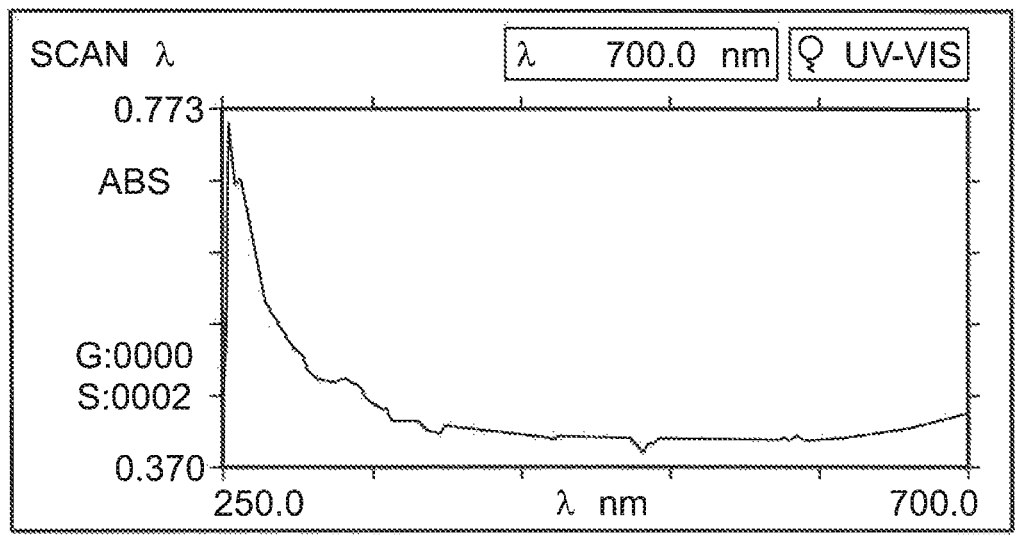
FIG. 4A shows UV-VIS spectra for Experiment 3 with a graphene solution in water at 33° C., single peak at 260 nm, indicating single to few layer suspended in distilled water.
Figure 4B:
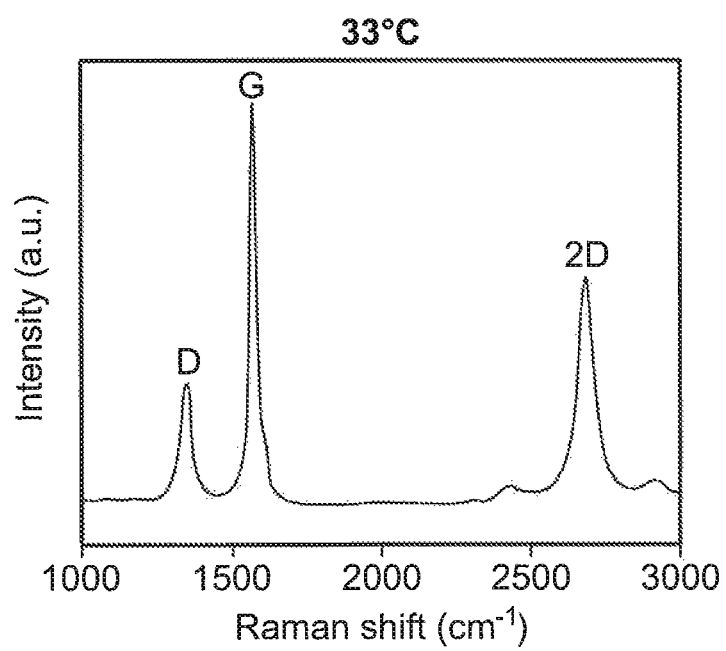
FIG. 4B shows Raman spectra of the exfoliated graphene showing signature related to single to few layer graphene in a water solution of 33° C.

FIG. 4A shows UV-VIS graph for the results of Experiment 2. Raman Data identifies defect free graphene FIG. 4B. UVIS data experiment 3, shows few layer to multi layer configuration.

Experiment 4: The experimental method comprised of adding lab grade graphite powder, five (5) microns in diameter inside a two liter double jacketed bio reactor, (2 g) per liter. The solvent used was distilled water with a neutral pH. Temperature was controlled using an external chiller 14° C. The method further comprised of injecting or bubbling ozone within the solution. Ozone production was created using a proton exchange membrane ("PEM"), at least 18-20% ozone to oxygen ratio, for the experiment. Ozone was bubbled within the solution at a rate of 1.6 grams per liter per hour, with the addition of shear forces, using an external inline shear emulsifier. Total time exposed 12 hours while the solution was stirred at the same time, at a rate of 650 RPM. The dispersion was very good, stable for over a week.

Figure 5A:
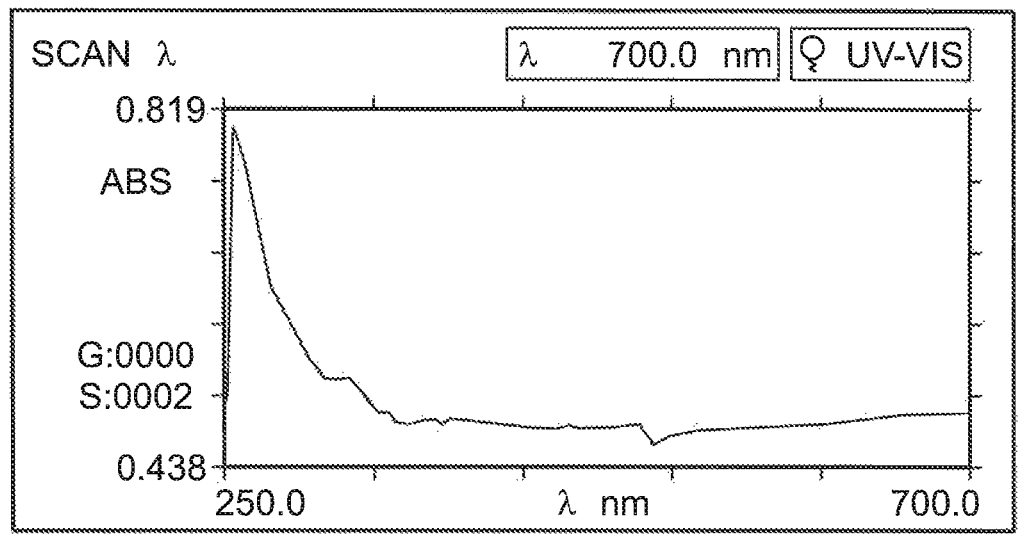
FIG. 5A shows UV-VIS spectra for Experiment 4 with a graphene solution in water at 14° C., single peak at 260 nm, indicating single to few layer suspended in distilled water.
Figure 5B:
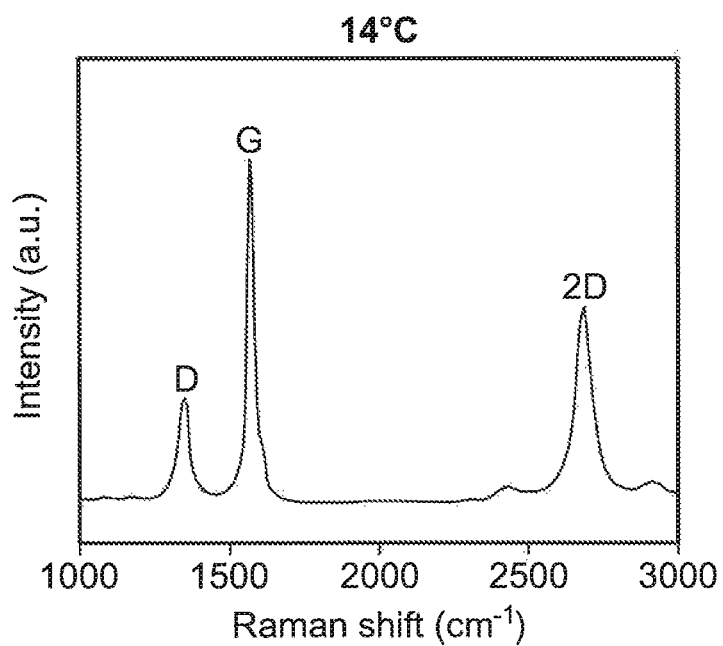
FIG. 5B shows Raman spectra of the exfoliated graphene showing signature related to single to few layer graphene in a water solution of 14° C.

FIG. 5A shows UV-VIS spectra of graphene solution in water, single peak at 260 nm, indicating single to few layer suspended in distilled water (AIP Advances 2, 032146 (2012); doi: 10.1063/1.4747817); unique to using an AOP for the exfoliation of graphite was the observed n-pie plasmon peak i.e. the hump at 326 nm in the samples, which we only see on graphene oxides at 230 nm produced by the Hummers method. However, the Raman characterization spectra identify the sample as to how defect free pristine graphene would present. The sample does not present the signature for graphene oxide or the signature for its reduced counter parts. FIG. 5B shows Raman spectra of the exfoliated graphene showing signature related to defect free graphene.

Experiment 5: The experimental method comprised of adding lab grade graphite powder, five (5) microns in diameter inside a two liter double jacketed bio reactor, (1 g) per liter. The solvent used was distilled water with a neutral pH. Temperature was controlled using an external chiller (5° C.). The method further comprised of injecting or bubbling ozone within the solution. Ozone production was created using a proton exchange membrane ("PEM"), at least 18-20% ozone to oxygen ratio, for the experiment. Ozone was bubbled within the solution at a rate of 1.6 grams per liter per hour, without the addition of shear forces. Total time exposed 24 hours while the solution was stirred at the same time, at a rate of 650 RPM. This achieved a stable dispersion in solution.

Figure 6:
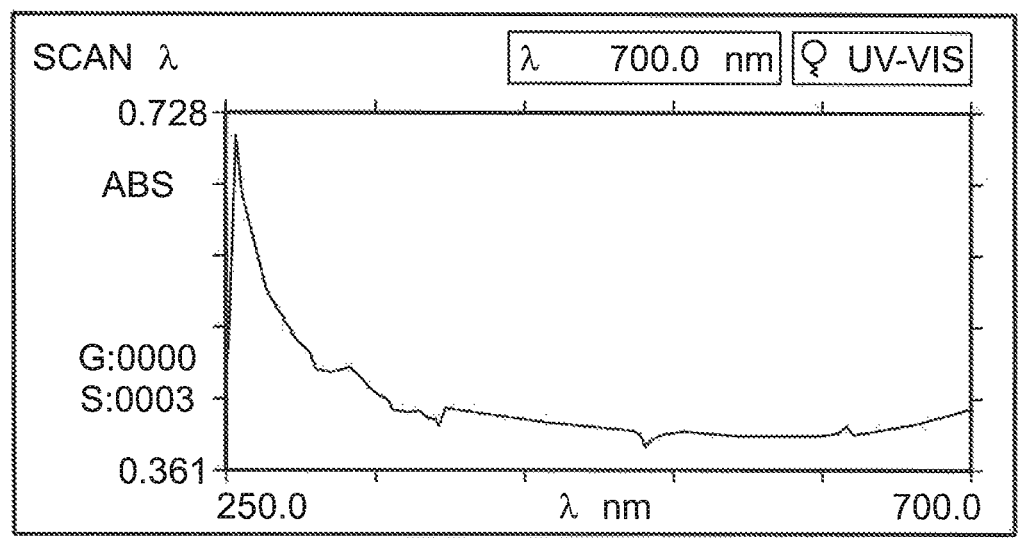
FIG. 6 shows UV-VIS spectra for Experiment 5 with a graphene solution in water at 14° C., single peak at 260 nm, indicating single to few layer suspended in distilled water.

Data shows for experiment 5, UV-VIS spectra of graphene solution in water, single peak at 260 nm, indicating single to few layer suspended in distilled water after 24 hours exposure at (5° C.) without the addition of shear forces. FIG. 6 shows UV-VIS graph for the results of Experiment 5.

Experiment 6: The same process was used on $MoS_2$. Three (3) grams total of lab grade bulk Molybdenum (IV) disulfide was added to two liters of distilled water within the bio reactor. Twenty-four hours of total exposure, no additional shear forces added, stirred at 1100 RPM at 26° C., null result, with visible particle precipitation in solution.

Figure 7:
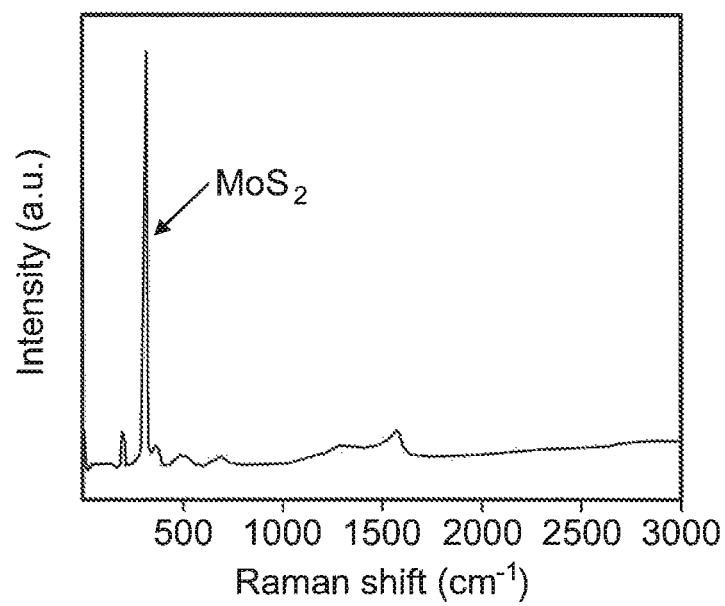
FIG. 7 shows Raman spectra showing high quality single layer to few layer $MoS_2$ at 5° C.

Experiment 7: The same process was used for the ($MoS_2$) without the addition of shear forces, just mechanical stirring. Three (3) grams total of lab grade bulk Molybdenum (IV) disulfide was added to two liters of distilled water within the 2 liter bio reactor. Twelve hours of total exposure, stirred at 1100 RPM at (5° C.) achieved a homogeneous dispersion with no precipitation even after months of sitting in solution with no additional shear forces necessary. The solution was golden in color, with no visible particles in the solution. Raman spectroscopy showed positive results for high quality ($MoS_2$), as shown in FIG. 7.

The production of 2D materials have been reduced to practice without the addition of chemical preprocessing techniques. For the graphite, the combination of chiller at low temperature with the addition of agitation has reduced the time significantly for processing. For MoS2, by lowing the temp to 5° C., was enough to produce in 12 hours. However, it is within scope of this invention to use additional shear forces to lower the processing times.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of exfoliating two-dimensional materials comprising:
    adding a bulk material to a polar solvent in a reactor vessel;
    dissolving ozone in the polar solvent that is chilled to between between 5° C. and 15° C.;
    exposing the polar solvent to shear forces imparted by a shear emulsifier; and
    exfoliating two-dimensional material from the bulk material.

2. The method of claim 1, wherein the bulk material is selected from the group consisting of graphite, Molybdenum disulfide ($MoS_2$), Molybdenum diselenide ($MoSe_2$), hexagonal boron nitride (h-BN), Tungsten disulfide($WS_2$), and Tungsten diselenide ($WSe_2$).

3. The method of claim 1, wherein the two-dimensional material is graphene.

4. The method of claim 1, wherein the two-dimensional material formed is from bulk is Molybdenum disulfide ($MoS_2$), Molybdenum diselenide ($MoSe_2$), hexagonal boron nitride (h-BN), Tungsten disulfide($WS_2$), and Tungsten diselenide ($WSe_2$).

5. The method of claim 1, wherein the two-dimensional material is single layer.

6. The method of claim 1, wherein the two-dimensional material is few layer.

7. The method of claim 1, wherein the two-dimensional material is multi layer.

8. The method of claim 1, further comprising agitating the polar solvent.

9. The method of claim 8, wherein the polar solvent has a temperature above 25° C.

10. The method of claim 1, wherein no chemical preprocessing of the bulk material is necessary.

11. The method of claim 10, further comprising exposing the solvent to ultraviolet (UV) radiation to enhance radical formation in the working $H_2O_2$ or $H_2O$ or $H_2O/H_2O_2$ solvent.

12. The method of claim 1, wherein the working solvent can be $H_2O_2$, $H_2O$, an inert PFC, or a mixture of these in any combination.

13. A method of exfoliating two-dimensional materials comprising:
    adding a bulk material to a polar solvent in a reactor vessel, the polar solvent selected from the group consisting of $H_2O_2$, $H_2O$, or a combination thereof;
    dissolving ozone in the polar solvent;
    exposing the polar solvent to ultraviolet (UV) radiation to enhance radical formation in the polar solvent; and
    exfoliating two-dimensional material from the bulk material by advanced oxidation process.

14. The method of claim 13, wherein the bulk material is selected from the group consisting of graphite, Molybdenum disulfide ($MoS_2$), Molybdenum diselenide ($MoSe_2$), hexagonal boron nitride (h-BN), Tungsten disulfide($WS_2$), and Tungsten diselenide ($WSe_2$).

15. The method of claim 13, wherein the two-dimensional material is graphene.

16. The method of claim 13, wherein the two-dimensional material formed is from bulk is Molybdenum disulfide ($MoS_2$), Molybdenum diselenide ($MoSe_2$), hexagonal boron nitride (h-BN), Tungsten disulfide($WS_2$), and Tungsten diselenide ($WSe_2$).

17. The method of claim 13, wherein the polar solvent is chilled from around room temperature to between 5° C. and 15° C.

18. The method of claim 13, further comprising, after dissolving ozone in the polar solvent, agitating the polar solvent by ultrasound in combination with shear forces imparted by a shear emulsifier, facilitating the exfoliating.

19. The method of claim 18, wherein the polar solvent has a temperature above 25° C.

* * * * *